Sept. 28, 1943.  J. MORKOSKI  2,330,303
POWER LIFT DEVICE
Filed Jan. 13, 1942  2 Sheets-Sheet 1

Inventor:
James Morkoski.
By Paul O. Pippel
Atty.

Sept. 28, 1943.　　　J. MORKOSKI　　　2,330,303
POWER LIFT DEVICE
Filed Jan. 13, 1942　　　2 Sheets-Sheet 2

Inventor:
James Morkoski.
By Paul O. Pippel
Atty.

Patented Sept. 28, 1943

2,330,303

UNITED STATES PATENT OFFICE 2,330,303

POWER LIFT DEVICE

James Morkoski, Canton, Ill., assignor to International Harvester Company, a corporation of New Jersey Application January 13, 1942, Serial No. 426,568

15 Claims. (Cl. 97—73)

This invention relates to a power-lift device. More particularly it relates to an enclosed, planetary-driven, reduced-gear power lift for raising and lowering the earth-working tools of implements.

The main object of the present invention is to provide an improved power-lift device.

Another important object of the present invention is to provide a power-lift device which may be operated by either a pneumatic-tired wheel or a steel wheel. For example, it is desirable to use stock-sized auto tires on farm implements. These stock-sized tires most generally are of a smaller diameter than the standard steel wheels ordinarily provided thereon. When small wheels are used to operate the power lift, the wheels slip easily and the efficiency of the lift is reduced. Hence, it is necessary that a reduced gear drive be provided in the power lift.

Another object of the present invention is to provide a planetary, gear-driven power-lift device in which the engagement and disengagement of the clutch is accomplished through a small angular rotation of the clutch plate.

Another object of the present invention is to so mount the manual control means for operating the power lift that the entire mechanism may be mounted in a compact enclosure.

These and other objects and advantages of the present invention will be apparent to those skilled in the art after a consideration of the following description of a preferred structural embodiment of the present invention, shown in the accompanying drawings.

Figure 1:
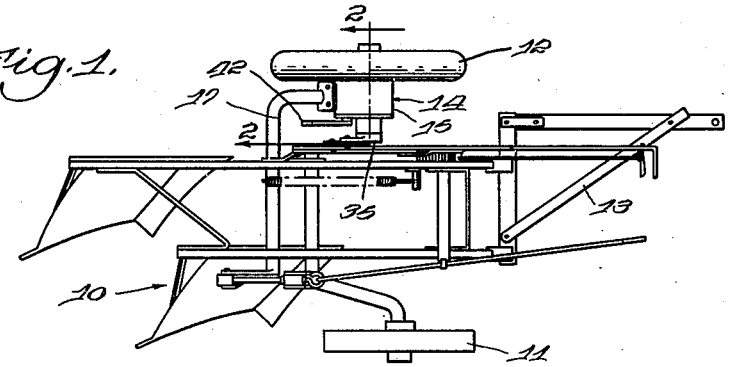
Figure 1 is a plan view of a plow on which is provided the novel power-lift device.

Referring now to the drawings, more particularly to Figure 1, it will be noted that the novel power-lift device has been mounted on a conventional type mold-board plow 10 which is provided with the usual furrow wheel 11 and land wheel 12. The usual hitch device 13 is connected to the front of the plow 10. The novel power-lift device 14 is operably connected with the land wheel 12.

The power-lift device 14 comprises a housing 15 which is adapted to be secured, by a plurality of bolts 15a, to the end of a crank axle 17 which is provided for the land wheel 12.

Figure 2:
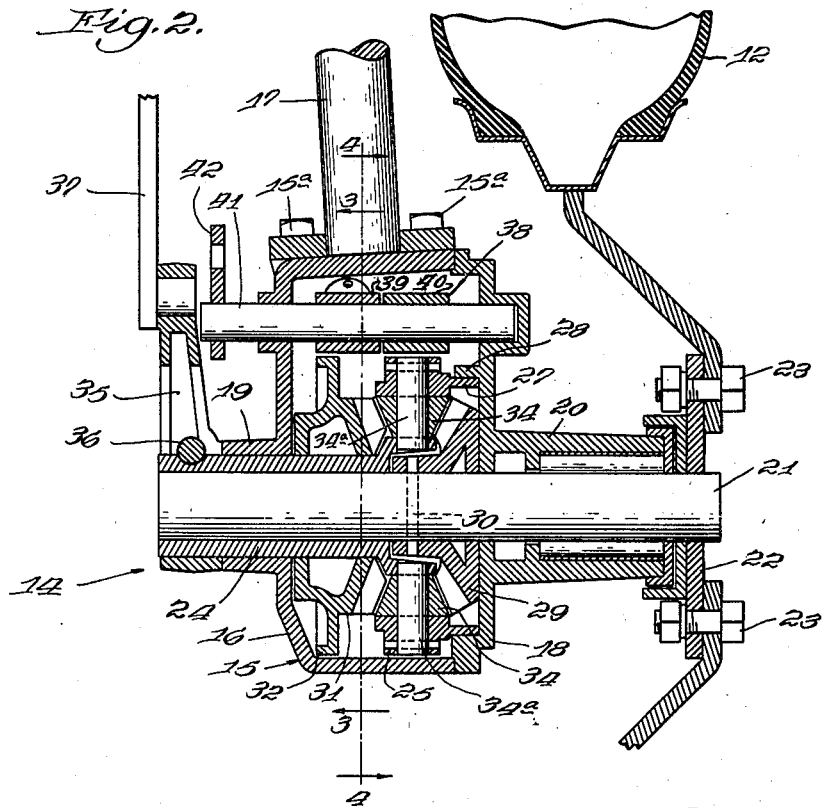
Figure 2 is a sectional view taken along the line 2—2 of Figure 1 and illustrates the novel reduced gear power-lift mechanism.
Figure 3:
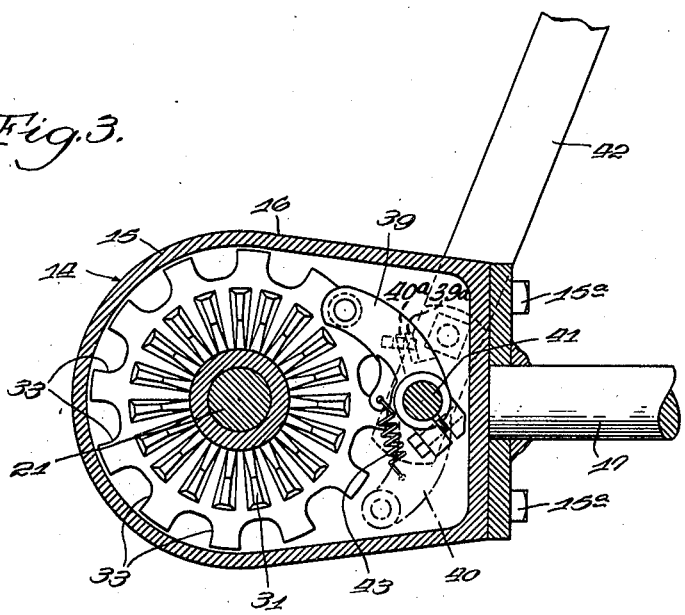
Figure 3 is a sectional view taken along the line 3—3 of Figure 2 and illustrates the manual control means for operating the clutch mechanism.
Figure 4:
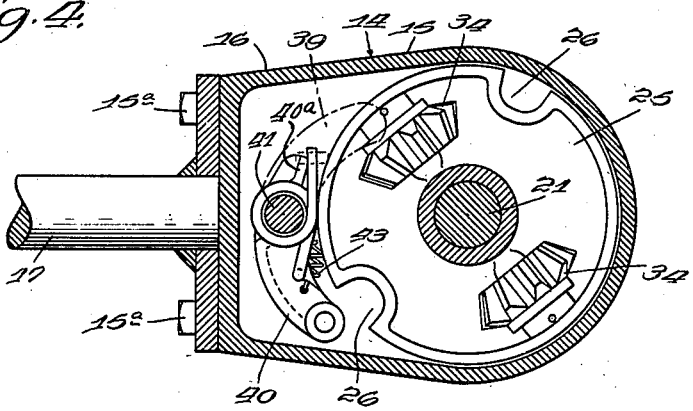
Figure 4 is a sectional view taken along the line 4—4 of Figure 2.

Referring now to Figure 2, it is to be noted that the housing 15 comprises mating housing sections 16 and 18 which are adapted to be secured together. The mating sections 16 and 18 are provided with alined bearing portions in the form of cylindrical sleeve portions 19 and 20. In the sleeve portion 20 is journaled a shaft 21, to the outer end of which is secured a radially extending plate 22 to which the land wheel 12 is secured by means of bolt 23. The shaft 21 is in effect the driver shaft, since it is rotated by the movement of the land wheel over the ground. The shaft 21 extends through the sleeve portion 19, and on this extended end of the axle 21 is journaled a carrier member in the form of a sleeve 24. The sleeve 24 is disposed between the inner diameter of the sleeve 19 and the outer diameter of the shaft 21. A radially extending portion or plate 25 extends from the sleeve 24 within the housing 15. As shown in Figure 4, the periphery is provided with at least two engaging portions or openings 26. The radially extending portion 25 is also provided with a circumferential flange portion 27 which is adapted to fit in journaled relation within a circumferential flange portion 28 provided on the housing section 18. A bevel gear 29 is secured to the shaft 21 by means of a suitable pin 30 and is positioned between the plate portion 25 of the sleeve 24 and the housing section 18. On the sleeve portion 24 and within the housing 15 is journaled a bevel gear 31 which is provided with a radially extending flange or plate portion 32 in the periphery of which is provided a plurality of engaging portions or openings 33, as shown in Figure 3. The bevel gear 29 is operably connected to the bevel gear 31 by a pair of planetary pinion gears 34 which are journaled on suitable pins 34a carried by the radially extending flange 25 of the sleeve 24. The gears 29 and 31 are the sun and ring gears, respectively, of the planetary gear system thus provided, and the member or sleeve 24 is the driven shaft.

The sleeve 24 extends beyond the sleeve 19 of the housing section 16, and a suitable lifting arm 35 is secured thereto by means of a pin 36. The lifting arm 35 is operatively connected by a link 37 to the plow 10 for adjusting the plow. The arm 35 is adapted to be held in either one of its two predetermined positions by a manually controlled means 38. The positions are determined by the engagement of the means 38 with one or the other of the engaging portions 26 in the portion 25, as will be presently described in detail. The manually controlled means 38 operates the power lift and comprises an engaging means in the form of a pair of spring-pressed dogs 39 and 40 which are mounted on a shaft 41 that is journaled in the housing sections 16 and 18 as shown in Figures 2, 3, and 4. In Figure 3, the section is taken so that the dog 40 is shown in phantom, and in Figure 4, the dog 39 is shown in phantom. The shaft 41 is positioned between the shaft 21 and the connection of the axle 17 to the housing 15. By positioning the shaft at this point, the casing can be arranged more compactly as will be apparent upon reference to Figures 3 and 4. The casing may extend close to the periphery of the plate portions 25 and 32, the dogs 39 and 40 having ample room for their operation in the space between the walls of the housing 15 and its connection to the axle 17.

The dog 39 is keyed to the shaft 41 and the dog 40 is so mounted on the shaft as to have limited angular movement with respect to the shaft. A tension spring 43 connects the dogs so that the dog 40 is urged toward the dog 39, the result being that the dog 40 is resiliently held in engagement with a notch 26 in the plate 25. The dog 39 carries a lug 39a that is adapted to engage a lug 40a on the dog 40. When the shaft 41 is rocked, as by a lever 42, to the position shown in Figure 3, the lug 39a on the dog 39 engages the lug 40a on the loosely mounted dog 40 and thus rocks the dog 40 out of engagement with the notch 26 in the plate 25. When the lever 42 is moved in the other direction, after the plow has been lifted, the shaft 41 is rocked and the keyed dog 39 is disengaged from a notch 33 in the plate 32. The spring 43 then causes the free dog 40 to ride on the outer periphery of the plate 25, and when the next notch 26 presents itself the dog 40 drops in. A pull rope is connected to the lever 42 and provides means by which the lift may be remotely controlled.

As previously mentioned, the bevel gear 29 is the driver gear, and, when the implement is in an operating position, the shaft 21, the bevel gear 29, the pinion gears 34, and the journaled bevel gear 31 rotate constantly and the dog 40 is in engagement with one of the engaging portions 26 so as to hold the member or carrier 25 and the lifting arm 35 in fixed positions. The bevel gear 31 is driven by virtue of its connection with the bevel gear 29 through the pinion gears 34. Figure 4 shows the position of the dog 40 as being moved out of a notch or opening 26 to effect operation of the power lift. At the same time, the dog 39 has been engaged with one of the notches 33 in the plate 32 of the gear 31.

When it is desired to lift the implement, the lever 42 is moved so that the dog 39 assumes the position shown in Figure 3 and engages one of the engaging portions 33 of the bevel gear 31. The bevel gear 31 is then locked against rotation. Since the implement is still moving over the ground, the land wheel 12 rotates the axle 21 which in turn rotates the bevel gear 29, and, by virtue of its connection through the pinion gears 34 to the bevel gear 31 which is now in a fixed position, the member or sleeve portion 24 is rotated until the dog 40 seats itself in the other engaging portion 26 of the radially extending portion 25. The rotation of the sleeve portion 24 moves the lifting arm 35 approximately 150° from its former fixed position. The movement of the lifting arm 35 through the link 37 raises the plow. By virtue of the drive produced by the bevel gears 29 and 31 and the pinion gears 34, approximately two complete rotations of the land wheel 12 are necessary to move the lifting arm 35 to raise the plow. In this way small land wheels may be used, since the reduced gear lessens the load and the land wheel 12 will not slip. It is also to be noted that the operation of this novel mechanism is almost instantaneous in that, when the lever 42 is moved into position for lifting the plow, the dog 39 can always find an engaging portion 33, since the entire periphery of the bevel gear 31 is provided with engaging portions 33. In other words, the engagement and disengagement of the clutch is accomplished through a small angular rotation of the clutch. The dog mounting is such that a more compact case may be provided for the entire power-lift device. Since the device is enclosed, suitable lubricants may be provided for the parts which materially reduce their wear.

In view of the foregoing description, it should be apparent that a novel, compact, and efficient power-lift device has been provided for implements, and that the structure disclosed accomplishes all the previously mentioned objects.

While only a preferred construction embodying the principles of the present invention has been shown and described, it is to be understood that the invention is not to be limited to the specific details shown and described, but that, in fact, widely different means may be employed in the practice of the broader aspects of the invention.

What is claimed is:

1. A power-lift device comprising, in combination, a driver shaft, a driven shaft having at least two engaging portions, a gear secured to the driver shaft, a gear journaled on the driven shaft and having a plurality of engaging portions, gears carried by the driven shaft and adapted to engage said gear on the driver shaft and the gear journaled on the driven shaft, and means normally engageable with one of the engageable portions of the driven shaft for holding said shaft from rotating and upon disengagement therefrom engageable with one of the engaging portions of said gear journaled on the driven shaft for driving the driven shaft from the rotation of the driver shaft until the means engages the other engaging portion of the driven shaft.

2. A power-lift device comprising, in combination, a driver shaft, a driven shaft having at least two engaging portions, a bevel gear secured to the driver shaft, a bevel gear journaled on the driven shaft and having a plurality of engaging portions, pinion gears carried by the driven shaft and adapted to engage said bevel gear on the driver shaft and the bevel gear journaled on the driven shaft, and a manually controlled means normally engageable with one of the engageable portions of the driven shaft for holding said shaft from rotating and upon disengagement therefrom engageable with one of the engaging portions of said bevel gear journaled on the driven shaft for driving the driven shaft from the rotation of the driver shaft until said means engages the other engaging portion of the driven shaft.

3. A power-lift device comprising, in combination, a driver shaft, a driven shaft having at least two engaging portions, a bevel gear secured to the driver shaft, a bevel gear journaled on the driven shaft and having a plurality of engaging portions, pinion gears carried by the driven shaft and adapted to engage said bevel gear on the driver and the bevel gear journaled on the driven shaft, and a spring-pressed manually operable lever normally engageable with one of the engageable portions of the driven shaft for holding said shaft from rotating and upon disengagement therefrom engageable with one of the engaging portions of said gear journaled on the driven shaft for driving the driven shaft from the rotation of the driver shaft until the means engages the other engaging portion of the driven shaft.

4. A power-lift device comprising, in combination, a driver shaft having a traction wheel secured thereto, a driven shaft having at least two peripheral engaging portions, an arm secured to the end of the driven shaft, a bevel gear secured to the driver shaft, a bevel gear journaled on the driven shaft and having a plurality of peripheral engaging portions, pinion gears carried by the driven shaft and adapted to engage said bevel gear on the driver shaft and the gear journaled on the driven shaft, and a spring-pressed manually controlled dog normally engageable with one of the engageable portions of the driven shaft for holding said shaft from rotating and maintaining said arm in one position, and upon disengagement therefrom engageable with one of the engaging portions of said gear journaled on the driven shaft for driving the driven shaft from the rotation of the driver shaft by the wheel secured thereto until the means engages the other engaging portion of the driven shaft, thereby maintaining the arm in another position.

5. A power-lift device comprising, in combination, a housing in which there is journaled a driver shaft and a driven shaft having at least two peripheral engaging portions, a bevel gear secured to the driver shaft within said housing, a bevel gear journaled on the driven shaft within said housing and having a plurality of peripheral engaging portions, pinion gears carried by the driven shaft and adapted to engage said gear on the driver shaft and the gear journaled on the driven shaft, and means normally engageable with one of the engageable portions of the driven shaft for holding said shaft from rotating and upon disengagement therefrom engageable with one of the engaging portions of said gear journaled on the driven shaft for driving the driven shaft from the rotation of the driver shaft until the means engages the other engaging portion of the driven shaft.

6. A power-lift device comprising, in combination, a housing, a driver shaft journaled in the housing, a bevel gear secured to the driven shaft, a driven shaft having at least two peripheral engaging portions journaled in the housing, a bevel gear having a plurality of peripheral engaging portions journaled on the driven shaft, pinion gears carried by the driven shaft and adapted to engage the bevel gear secured on the driver shaft and the bevel gear journaled on the driven shaft, and manually controlled means normally engageable with one of the engaging portions of the driven shaft for holding said shaft in one position and upon disengagement therefrom engageable with one of the engaging portions of the bevel gear journaled on the driven shaft, whereby the driven shaft through said gears rotates the driven shaft until said means engages the other engaging portion of the driven shaft, thereby holding it in another position.

7. A power-lift device comprising, in combination, a housing, a driver shaft journaled in the housing, a bevel gear secured to the driver shaft within the housing, a driven member journaled on the driver shaft, said driven member comprising a radially extending portion in which two peripheral engaging portions are provided and a sleeve portion extending from said radially extending portion out of said housing, an arm secured to said sleeve portion, a bevel gear having a plurality of peripheral engaging portions journaled on said driven member, pinion gears carried by said radially extending portion of the driven member and adapted to engage the bevel gear journaled on the driven member and the bevel gear secured to the driver shaft, a shaft journaled in said housing, a manually controlled lever extending from said shaft, a spring-pressed dog mounted on said shaft within the housing and adapted to normally engage one of the engaging portions of the driven member for maintaining said arm in a fixed position and upon actuation of said lever movable into engagement with one of the engaging portions of said bevel gear journaled on the driven shaft, whereby the rotation of the driver shaft through the bevel gear secured thereto and the pinion gears carried by the driven member will rotate said member until the dog seats itself in the other engaging portion of said driven member thereby maintaining said arm in another fixed position.

8. A power-lift device for an implement having an adjustable part comprising a housing, a driver shaft journaled in the housing, a bevel gear secured to the driver shaft within the housing, a driven member journaled on the driver shaft, said driven member comprising a radially extending portion in which two peripheral engaging portions are provided and a sleeve portion extending from said radially extending portion out of said housing, an arm secured to said sleeve portion, a link connecting said arm to the adjustable part of the implement, a bevel gear having a plurality of peripheral engaging portions journaled on said driven member, pinion gears carried by said radially extending portion of the driven member and adapted to engage the bevel gear journaled on the driven member and the bevel gear secured to the driver shaft, a shaft journaled in said housing, a manually controlled lever extending from said shaft, a spring-pressed dog mounted on said shaft within the housing and adapted to normally engage one of the engaging portions of the driven member for maintaining said arm in a fixed position and upon actuation of said lever movable into engagement with one of the engaging portions of said bevel gear journaled on the driven shaft, whereby the rotation of the driver shaft through the bevel gear secured thereto and the pinion gears carried by the driven member will rotate said member until the dog seats itself in the other engaging portion of said driven member thereby maintaining said arm in another fixed position thereby adjusting said implement part.

9. A power-lift device for implements comprising, in combination, a housing having two mating sections, alined sleeve portions extending from the mating sections of the housing, a member journaled in one of the sleeve portions and extending inside and outside of the housing, an arm secured to the member outside of the housing, said member having a radially extending portion within the housing in which two peripheral engaging portions are provided, pinion gears carried by the radially extending portion, a bevel gear having a plurality of peripheral engaging portions journaled on the member within the housing, said bevel gear engaging the pinion gears, a shaft journaled within the member and the other sleeve portion, a bevel gear secured to the shaft within the housing and engageable with the pinion gears, means for driving the shaft, and manually controlled means carried by the housing and normally engageable with one of the engaging portions of said member for holding the arm in one fixed position and upon disengagement therefrom engageable with one of the engageable portions of the journaled bevel gear, whereby the rotation of the shaft will rotate the member until the manually controlled means engages the other engaging portion of said member thereby holding the arm in another fixed position.

10. A power-lift device for implements comprising, in combination, a housing having two mating sections, alined sleeve portions extending from the mating sections of the housing, a member journaled in one of the sleeve portions and extending inside and outside of the housing, an arm secured to the member outside of the housing, said member having a radially extending portion within the housing in which two peripheral engaging portions are provided and a circumferential flange portion, one of said sections having a circumferential flange portion adapted to receive said first mentioned circumferential flange, pinion gears carried by the radially extending portion, a bevel gear having a plurality of peripheral engaging portions journaled on the member within the housing, said bevel gear engaging the pinion gears, a shaft journaled within the member and the other sleeve portion, a bevel gear secured to the shaft within the housing and engageable with the pinion gears, means for driving the shaft, and manually controlled means carried by the housing and normally engageable with one of the engaging portions of said member for holding the arm in one fixed position and upon disengagement therefrom engageable with one of the engageable portions of the journaled bevel gear, whereby the rotation of the shaft will rotate the member until the manually controlled means engages the other engaging portion of said member thereby holding the arm in another fixed position.

11. A power-lift device for plows having a crank axle journaled thereon comprising, in combination, a housing having two mating sections, means for securing said housing to said crank axle, alined sleeve portions extending from the mating sections of the housing, a member journaled in one of the sleeve portions and extending inside and outside of the housing, an arm secured to the member outside of the housing, a link connecting said arm and the plow, said member having a radially extending portion within the housing in which two peripheral engaging portions are provided and a circumferential flange portion, one of said sections having a circumferential flange portion adapted to receive said first mentioned circumferential flange, pinion gears carried by the radially extending portion, a bevel gear having a plurality of peripheral engaging portions journaled on the member within the housing, said bevel gear engaging the pinion gears, a shaft journaled within the member and the other sleeve portion, a bevel gear secured to the shaft within the housing and engageable with the pinion gears, means for driving the shaft, and manually controlled means carried by the housing and normally engageable with one of the engaging portions of said member for holding the arm in one fixed position and upon disengagement therefrom engageable with one of the engageable portions of the journaled bevel gear, whereby the rotation of the shaft will rotate the member until the manually controlled means engages the other engaging portion of said member thereby holding the arm in another fixed position.

12. A power-lift device comprising, in combination, a housing having two mating sections, alined bearing portions in said mating sections, a member adapted to be held in a plurality of predetermined positions journaled at one of its ends in the bearing portion of one of said sections and journaled at its other end in said other section, pinion gears carried by said member, a shaft journaled within said member and the bearing portion of one of said sections, means for driving said shaft, a bevel gear secured to said shaft and adapted to engage said pinion gears, a bevel gear journaled on said member and adapted to engage said pinion gears, and manually controlled means for normally holding said member from rotating and upon release therefrom adapted to hold the journaled bevel gear from rotating, whereby the driver shaft through the pinion gears will rotate said member through a predetermined cycle at which time the means again holds the member in a fixed position.

13. A power-lift device: comprising a constantly rotatable driving element; an intermittently rotatable driven element; planetary gearing connecting said elements and including a sun gear on the driving element, a carrier on the driven element, planet gears on the carrier and meshing with the sun gear, and a ring gear meshing with the planet gears; means for releasably locking the carrier; means for releasably locking the ring gear; and means for controlling both of said locking means.

14. A power-lift device: comprising a constantly rotatable driving element; an intermittently rotatable driven element; planetary gearing connecting said elements and including a sun gear on one element, a carrier on the other element, planet gears on the carrier and meshing with the sun gear, and a ring gear meshing with the planet gears; a clutch for the carrier; a clutch for the ring gear; and means for controlling both of said clutches.

15. A power-lift device: comprising a constantly rotatable driving element; an intermittently rotatable driven element; planetary gearing connecting said elements; and means for controlling said gearing to drive the driven element from the driving element.

JAMES MORKOSKI.